W. R. PHELPS.
EXCELSIOR MACHINE.
APPLICATION FILED MAY 18, 1907.
919,454.
Patented Apr. 27, 1909.
2 SHEETS—SHEET 2.
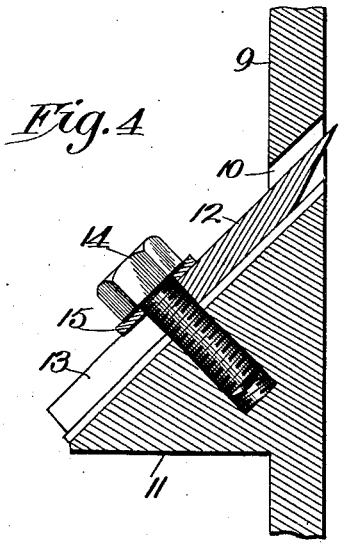
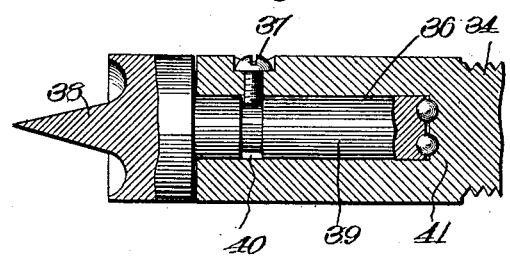
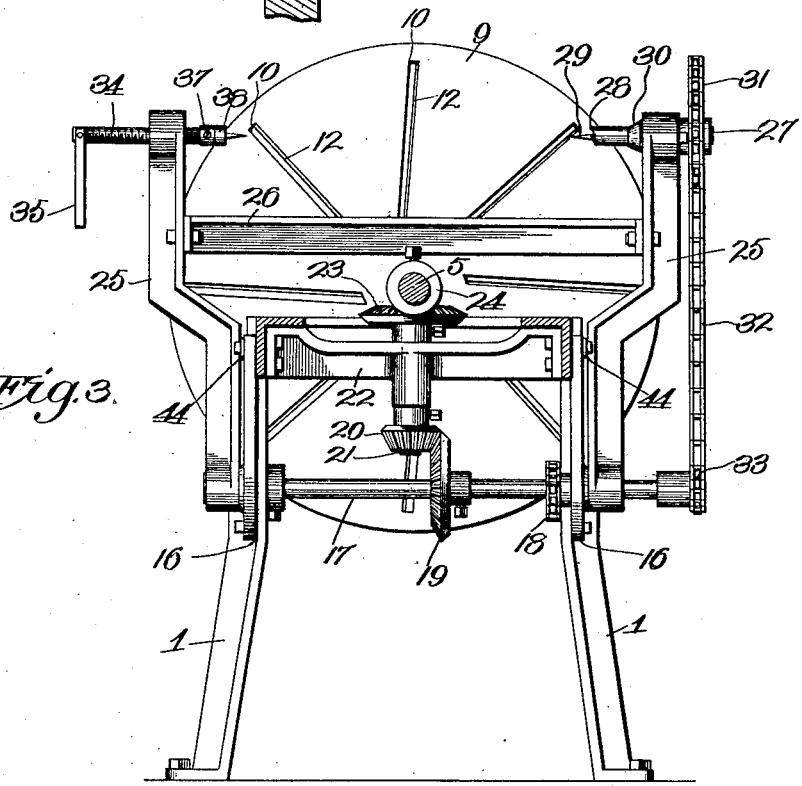
Witnesses
Frank R Glore
H. C. Rodgers
Inventor
Wm R. Phelps.
By George H Thorpe Atty

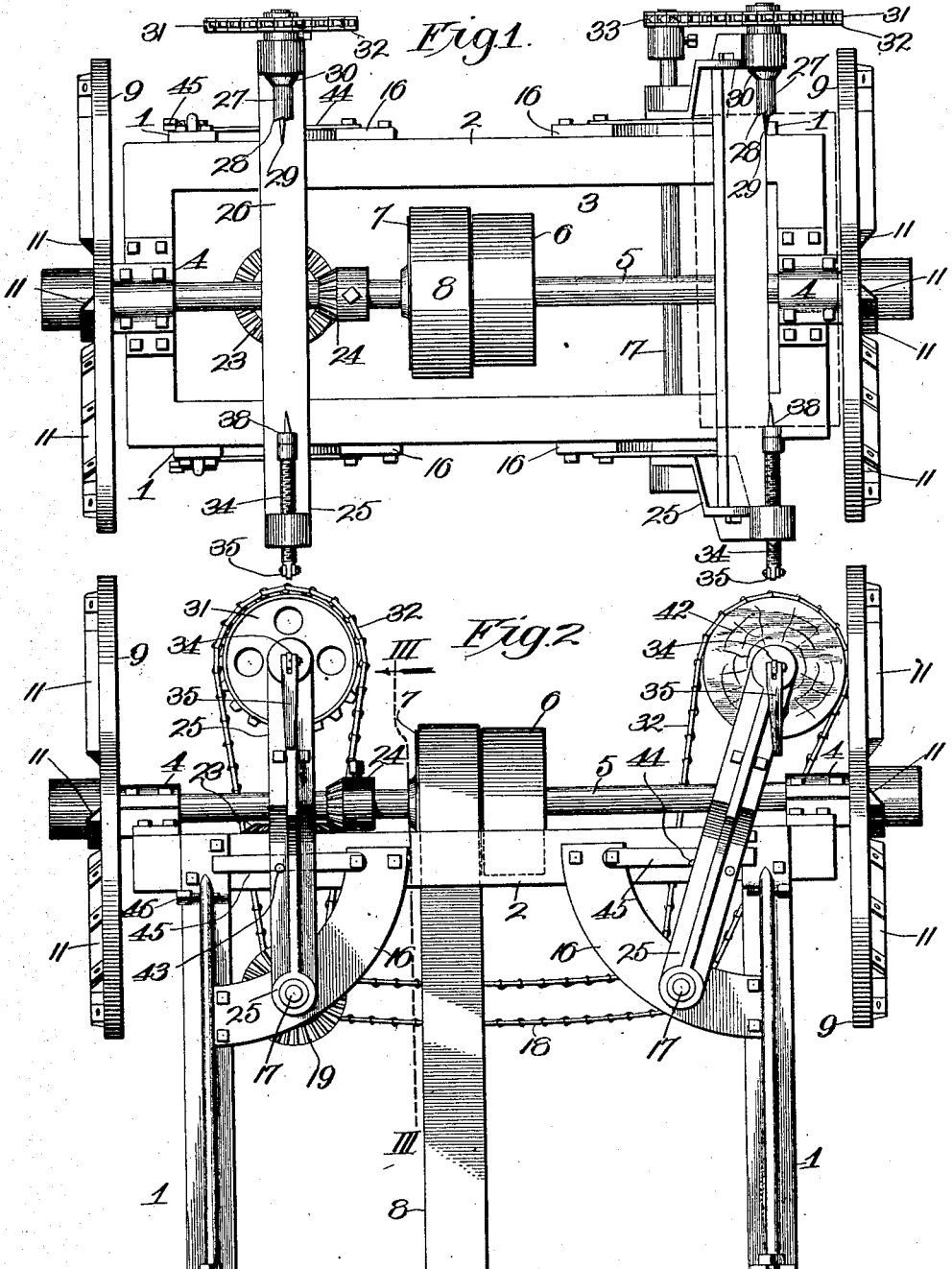

UNITED STATES PATENT OFFICE.

WILLIAM R. PHELPS, OF KANSAS CITY, MISSOURI.

EXCELSIOR-MACHINE.

No. 919,454.      Specification of Letters Patent.      Patented April 27, 1909.

Application filed May 18, 1907. Serial No. 374,509.

*To all whom it may concern:*

Be it known that I, WILLIAM R. PHELPS, a citizen of the United States, residing at Kansas City, in the county of Jackson and State of Missouri, have invented certain new and useful Improvements in Excelsior-Machines, of which the following is a specification.

This invention relates to excelsior machines and has for its object the production of a machine of this character which will operate efficiently and reliably and which is of simple, strong, durable, compact and inexpensive construction.

To this end the invention consists in certain novel and peculiar features of construction and organization as hereinafter described and claimed; and in order that it may be fully understood reference is to be had to the accompanying drawings, in which—

Figure 1, is a top plan view of an excelsior machine embodying my invention. Fig. 2, is a side elevation of the same. Fig. 3, is a cross section taken on the line III—III of Fig. 2. Fig. 4, is a fragmentary cross section of one of the cutting disks. Fig. 5, is a view partly in section and partly in elevation, of one of the chuck members forming part of the machine.

In the said drawings, a table comprises corner legs 1, and a horizontal bed 2 provided with a large rectangular opening 3, and secured upon the opposite ends of the table are bearings 4, for the longitudinal shaft 5 equipped with a fast pulley 6, and a loose pulley 7, a driving belt 8 normally engaging the loose pulley as shown, and adapted to be thrown into engagement with the fast pulley when it is desired to operate the shaft.

Secured rigidly upon the shaft at opposite ends of the table are disks 9 provided with slots 10 which preferably extend tangentially with respect to the shaft, and formed integral with the disks and at their outer sides are ribs 11 which are triangular in cross section and have their hypotenuse sides flush or in the same plane with the inner sides of slots 10, as shown clearly in Fig. 4.

12 indicates cutting blades fitting against ribs 11 and having their sharpened edges projecting inwardly through slots 10 and said blades are provided with bifurcations 13, through which extend into said ribs clamping bolts 14, washers 15 being interposed between the knife blades 12 and the heads of the bolts.

16 indicates four bearing plates secured at their lower ends to the four legs and at their upper ends to the bed and forming journals for a pair of transverse shafts 17 geared together preferably by a chain and sprocket gearing 18. One of the shafts 17 is provided with a bevel gear 19 meshing with a bevel pinion 20 secured to the lower end of a short vertical shaft 21 journaled in a transverse bearing bracket 22 secured to the bed, the upper end of said shaft 21 being provided with a bevel gear 23 meshing with a bevel pinion 24 secured on shaft 5.

Journaled at their lower ends on shaft 17 are a pair of rock frames, each consisting of a pair of arms 25 connected above shaft 5 by a cross bar 26 equipped with a chuck comprising a driving member and a journal member adjustable toward or from the driving member. The driving member comprises a shaft 27 journaled in the upper end of the rear arm of the frame and provided at its inner ends with a toothed or roughened surface 28 and with a central prong 29. It also is equipped with a collar or enlargement 30 to prevent rearward sliding movement in the arm and with a sprocket wheel 31 at the rear side of said arm connected by a sprocket chain 32 with a sprocket wheel 33 on the rear end of the companion shaft 17 in order that the operation of the latter shall impart rotary movement to the driving member of the chuck.

The adjustable journal member comprises a screw 34 mounted in the front arm of the rock frame and provided at its front end with a handle or crank 35. At its rear end it is provided with a cylindrical socket 36, and a set screw 37 to project into said socket.

38 is a pronged head fitting against the end of the adjustable member and provided with a cylindrical stem 39 journaled in said socket and formed with a circular groove or channel 40 to receive the inner end of the set screw in order that the latter may prevent dislocation of the swiveled head. The end thrust of said swiveled head is taken up by the ball bearing 41, which bearing reduces friction between the head and screw to such an extent that the latter will not be turned by the revolution of the head induced by the rotation imparted by the rotatable member to a log or block of wood 42 fed between the members with the prongs embedded in the center of its ends, the block being secured rigidly in the chuck by screwing home the adjustable members until the toothed end 28 of the driving member is embedded in the end of the block so as to insure rotatable movement of the latter.

One of the arms of each rock frame is provided with a rearwardly projecting pin 43, for engagement with the notch 44 in the lower edge of a latch 45 pivoted to the contiguous plate 16. The engagement of this latch with the rock frame holds the latter reliably in such position that the block of wood may be readily secured in or removed from the chuck. After it is thus secured the belt is shifted from the loose to the fast pulley so as to impart rotation to all of the rotatable elements of the machine and then the latch is disengaged and the rock frame permitted to swing outward toward its adjacent cutting disk 9 until the wood block comes into the plane of action of the knives when the latter slice from it shavings which constitute the excelsior, the revolution of the wood block at the same time resulting in the wood being reduced quickly to perfect cylindrical form, the gravitative tendency of the frame and block holding the latter in continuous engagement with the blades until the rock frame comes into engagement with the adjustable stop bolt 46 carried by one of the legs of the table, this stop bolt thus guarding against any possibility of the rock frame or chuck coming into engagement with the blades. When the block is reduced to the desired extent the rock frame is swung back and secured in its vertical position and another block substituted, the former actions being then repeated. It will thus be seen that the block is fed by gravity to the cutting mechanism and that the machine needs no attention after being once started in operation other than the insertion and removal of the blocks.

From the above description it will be apparent that I have produced an excelsior machine possessing the features of advantage enumerated as desirable and I wish it to be understood that I do not desire to be restricted to the exact details of construction shown and described as obvious modifications will suggest themselves to one skilled in the art.

Having thus described the invention what I claim as new and desire to secure by Letters Patent is:—

An excelsior machine, comprising a horizontal rectangular bed provided with supporting legs, quadrant-shaped bearing plates connecting the side of the bed with the said legs, a pair of transverse shafts journaled in said plates and provided with sprocket wheels and one of them with a bevel gear, chains connecting said sprocket wheels, a second pair of sprocket wheels on said shafts, a driving shaft above said pair of shafts and extending longitudinally of and journaled in said frame and equipped with a bevel gear and a pair of inwardly-facing rotary cutters, a cross-bar for the frame, a vertical shaft journaled therein and provided at its upper end with a bevel gear meshing with the bevel-gear of the driving shaft and at its lower end with a bevel-gear meshing with the bevel gear of one of the said pair of shafts, a pair of swing frames straddling the bed and each consisting of arms 25 journaled at their lower ends on said pair of shafts and a cross-bar above the driving shaft, chucks carried by the swing frames and each consisting of an adjustable journal member and a driving member, sprocket wheels rigid with the driving member, chains connecting said wheels with the second pair of sprocket wheels of the said pair of shafts, a pair of pivoted latches having notches, and pins projecting inward from the swing frames to engage said notches and lock the swing frames in inoperative relation with the cutters.

In testimony whereof I affix my signature, in the presence of two witnesses.

WILLIAM R. PHELPS.

Witnesses:
   H. C. RODGERS,
   G. Y. THORPE.